US006941656B2

(12) United States Patent
Michioka et al.

(10) Patent No.: US 6,941,656 B2
(45) Date of Patent: Sep. 13, 2005

(54) SPHERICAL BEARING AND METHOD FOR MANUFACTURING THE SAME

(75) Inventors: Hidekazu Michioka, Tokyo (JP); Junichi Kuwabara, Tokyo (JP); Kunihisa Takahashi, Tokyo (JP); Tomozumi Murata, Tokyo (JP); Takashi Sakae, Yamagata-ken (JP); Mitsuhiro Teramachi, Yamaguchi-ken (JP); Tsuyoshi Yamamoto, Yamaguchi-ken (JP); Fumiaki Morita, Yamaguchi-ken (JP)

(73) Assignee: THK Co., Ltd., Tokyo (JP)

( * ) Notice: Subject to any disclaimer, the term of this patent is extended or adjusted under 35 U.S.C. 154(b) by 99 days.

(21) Appl. No.: 10/211,349

(22) Filed: Aug. 5, 2002

(65) Prior Publication Data

US 2002/0184768 A1 Dec. 12, 2002

Related U.S. Application Data

(62) Division of application No. 09/841,076, filed on Apr. 25, 2001, now abandoned.

(30) Foreign Application Priority Data

May 18, 2000 (JP) ........................................ 2000-146238

(51) Int. Cl.[7] ............................ B21D 53/10; B21K 1/04
(52) U.S. Cl. ........................... 29/898.049; 29/898.043; 29/898.047; 29/898.048
(58) Field of Search ................... 29/898.043, 898.047, 29/898.048, 898.049, 898.05, 898.07, 527.5, 898.12; 384/192, 202–204, 206–214; 403/122, 132, 133, 135, 138, 145

(56) References Cited

U.S. PATENT DOCUMENTS

| 2,252,351 | A | * | 8/1941 | Paulus |
| 3,068,552 | A | * | 12/1962 | Williiams et al. |
| 3,193,910 | A | * | 7/1965 | Evans |
| 3,427,307 | A | * | 2/1969 | Atwater |
| 3,570,090 | A | * | 3/1971 | Teramachi |
| 3,581,363 | A | * | 6/1971 | Roesner et al. |
| 3,583,050 | A | * | 6/1971 | Teramachi |
| 3,629,921 | A | * | 12/1971 | Davies et al. |
| 3,786,543 | A | * | 1/1974 | Sato |
| 3,833,309 | A | | 9/1974 | Hobbs |
| 4,478,531 | A | | 10/1984 | Levinson et al. |
| 4,846,590 | A | * | 7/1989 | Teramachi .................. 384/206 |
| 5,070,609 | A | * | 12/1991 | Teramachi |
| 5,653,547 | A | | 8/1997 | Teramachi et al. |
| 6,098,287 | A | * | 8/2000 | Takahashi et al. |
| 6,139,788 | A | * | 10/2000 | Dorr |
| 6,152,641 | A | * | 11/2000 | Rabe |

FOREIGN PATENT DOCUMENTS

| DE | 19513714 | * | 2/1996 |
| GB | 2 080 401 A | | 2/1980 |
| JP | 63-188230 | * | 12/1988 |
| JP | 64-012118 | * | 1/1989 |
| JP | 06-200931 | * | 7/1994 |

OTHER PUBLICATIONS

English Abstract of Japanese Application Publication No. 62–288716, Published Dec. 1987.
English Abstract of Japanese Application Publication No. 05–026225, Published Feb. 1993.
English Abstract of Japanese Application Publication No. 07–190066, Published Jul. 1995.

* cited by examiner

Primary Examiner—Eric Compton
(74) Attorney, Agent, or Firm—Arent Fox PLLC (57) ABSTRACT

There are provided a spherical bearing and a method for manufacturing the same, in which both of a ball bearing section and a ball section made of metal can make light and smooth swinging and rotary motions for a long period of time without biased wear and seize-up of those members even if the solid bodies of them can contact with each other due to a discontinuous oil film under a heavy load. A resin liner that contacts the ball section of the inner member in a sliding relationship is embedded in the ball bearing section, and a resin sliding contact surface provided by the resin liner and the metal sliding surface are adjacent to each other without any gap to form a sliding contact surface at the bearing section.

11 Claims, 6 Drawing Sheets

SPHERICAL BEARING AND METHOD FOR MANUFACTURING THE SAME

This is a divisional of application Ser. No. 09/841,076 filed Apr. 25, 2001, now abandoned. The disclosure of the prior application is hereby incorporated by reference herein in entirety.

FIELD OF THE INVENTION AND RELATED ART STATEMENT

The present invention relates to a spherical bearing in which an inner member having a ball section serving as a center of swinging of a link mechanism and an outer member enclosing and holding the same are swingably or rotatably coupled and which is primarily used as a link motion mechanism or the like in a suspension arm section and a steering section of an automobile or a blade driving section of a combine, and the invention also relates to a method for manufacturing the same.

In general, known spherical bearings of this type include bearings which are equipped with an inner member having a ball section and an outer member having a ball bearing section for enclosing and holding the ball section of the inner member to be coupled to the inner member such that it can swing or rotate relative to the inner member. The ball bearing section of the outer member must undetachably enclose and hold the ball section against any load acting on the inner member. Therefore, a problem with such a spherical bearing is what kind of structure is to be used for enclosing the ball section in the ball bearing section and for maintaining free swinging and rotary motions of the ball section and ball bearing section.

One known structure conventionally used for a ball bearing section is provided by preparing a casing made of metal having a recess greater than the diameter of a ball section and press-fitting the ball section enclosed in a self-lubricant resin sheet into the casing (Japanese Patent Laid-Open No. 79320/1982, Japanese Utility Model Laid-Open No. 188230/1988, Japanese Patent Laid-Open Nos. 26225/1993 and 190066/1995, etc.). In this structure for a ball bearing section, since the resin sheet enclosing a ball section is pressed between the ball section and the casing to be subjected to elastic deformation, any gap between the ball section and the resin sheet is eliminated to allow the ball section to rotate in the casing without shaking. Further, since the ball section contacts only the resin sheet in a sliding relationship, there is no possibility of troubles such as biased wear of the ball section even when the spherical bearing is used for a long time.

However, a ball bearing section of this type in which a resin sheet is sandwiched between a ball section and a casing has problems including difficulty in achieving smooth and light movement of a link mechanism that is configured using the spherical bearing because the resin sheet that is in contact with the ball section in a compressed state makes the movement of the ball section somewhat heavy. Another problem arises in that the resin sheet is likely to wear when it is used for a certain period of time because the resin sheet is in contact with the spherical surface of the ball section under a pressure and in that such wear is likely to cause shaking between the ball bearing section and ball section. Further, a problem arises in that the ball section is likely to come off the ball bearing section when a heavy load is applied to the spherical bearing because the resin sheet is elastically deformed under such a heavy load.

Another structure for a ball bearing section is known in which a ball bearing section is cast using a ball section as a core to enclose the ball section in the ball bearing section (Japanese Patent Publication No. 77886/1992, etc.). In such a structure, since the spherical surface of the ball section is duplicated on the ball bearing section during casting, the gap between the cast ball bearing section and ball section made of metal can be minimized, which makes it possible to rotate the ball section in the ball bearing section without shaking only by supplying a small amount of oil into the gap between the ball section and ball bearing section. Further, since a microscopic gap is formed between the ball bearing section and ball section and lubrication is provided by forming an oil film in such a gap, the movement of the ball section is smoother and lighter than that in a ball bearing section that is structured to be put in contact with a resin sheet under a pressure. Furthermore, since the ball bearing section and ball section made of metal are in contact with each other in a sliding relationship with lubrication provided between them using an oil film, characteristics including excellent durability can be achieved in that they will not become shaky after use for a long time.

However, in the latter spherical bearing (Japanese Patent Publication No. 77886/1992) in which lubrication is provided using an oil film in the microscopic gap between the ball bearing section and ball section made of metal, the oil film may become discontinuous in regions where the pressure at the contact surface between the ball bearing section and ball section contact is high to cause the solid bodies of those members to contact each other under certain special conditions for use such as heavy loads and swinging at high speeds. When they are used even after the occurrence of such a phenomenon, biased wear of the ball section and ball bearing section may occur to hinder smooth operations of them and, in extreme cases, both of the members may seize up.

In such a spherical bearing whose ball bearing section is cast using the ball section as a core, although the gap between those sections can be certainly minimized because the spherical surface of the ball section is duplicated on the ball bearing section, a very small gap (in the range from about 0.05 to 0.1 mm) is provided between those sections to allow the ball section to move relative to the ball bearing section, and it has been impossible to eliminate shakes within the range of such a gap completely.

OBJECT AND SUMMARY OF INVENTION

The present invention has been conceived taking such problems into consideration, and it is an object of the invention to provide a spherical bearing in which a ball bearing section and a ball section made of metal can make smooth and light swinging and rotary motions for a long time without any biased wear and seize-up of those members even when the solid bodies of the members contact each other due to discontinuity of an oil film under a heavy load and to provide a method for manufacturing the same.

It is another object of the invention to provide a spherical bearing in which shaking between a ball section and a ball bearing section can be completely eliminated and which can make light and smooth swinging and rotary motions for a long time and to provide a method for manufacturing the same.

In order to achieve the above-described objects, according to the present invention, there is provided a spherical bearing which has an inner member with a ball section and an outer member with a ball bearing section for enclosing and holding the ball section of the inner member to be coupled with the inner member such that it can be swung or rotated relative to the inner member, the ball bearing section of the outer member having a metal sliding contact surface in a concave spherical configuration that is in contact with the ball section of the inner member in a sliding relationship and that undetachably encloses and holds the ball section, the spherical bearing being characterized in that a resin liner is embedded in the ball bearing section in contact with the ball section of the inner member in a sliding relationship and in that a resin sliding contact surface provided by the resin liner and the metal sliding contact surface are adjacent to each other without any gap to form a sliding contact surface at the bearing section.

In such a spherical bearing according to the invention, the metal sliding contact surface in a concave spherical configuration provided on the ball bearing section of the outer member undetachably encloses and holds the ball section of the inner member and, as a result, the inner member and outer member are coupled with each other such that they can make relative swinging or rotary motions. Therefore, light and smooth movement can be achieved by lubricating a microscopic gap between the metal sliding contact surface and the spherical surface of the ball section with an oil film. While the ball bearing section has a resin liner that is in contact with the ball section of the inner member, since the resin sliding contact surface provided by the resin liner adjoins the metal sliding contact surface without any gap between them to form a sliding contact surface at the bearing section for enclosing and holding the ball section, the gap between the resin liner and ball section is also lubricated with an oil film. This allows the smooth swinging and rotary motions of the inner member and outer member to be still maintained.

Further, by providing the resin liner in regions where the pressure at the contact surface between the ball section and ball bearing section is high, the solid body of the ball section contacts the resin sliding contact surface instead of the metal sliding contact surface even when the oil film becomes discontinuous between the ball section and ball bearing section, which makes it possible to prevent biased wear of the ball section and seize-up of the ball section and ball bearing section.

The resin liner may be provided in any location of the ball bearing section. A location where the oil film becomes discontinuous between the ball bearing section and ball section is a location where a high contact surface pressure is generated between them, and such a location may be different depending on the specific mode of use of the spherical bearing. However, if the resin liner is located at the end of the spherical bearing, the resin liner is elastically deformed to make the ball section more likely to come out the ball bearing section when a load acts in the direction of pulling out the ball section from the ball bearing section. From such a point of view, the resin liner is preferably provided such that the resin sliding contact surface is surrounded by the metal sliding contact surface.

While the ball section of the spherical bearing according to the invention is undetachably enclosed and held by the metal sliding contact surface provided on the ball bearing section, it is very much difficult to form the metal sliding contact surface in a concave spherical configuration that is substantially compliant to the spherical surface of the ball section through mechanical processing and to form a microscopic gap to be lubricated with an oil film between them. Even if such a metal sliding contact surface can be provided on the ball bearing section through mechanical processing, a high processing cost will be required. From the viewpoint of reductions in manufacturing costs and labor and formation of an accurate metal sliding contact surface, it is therefore preferable to form the ball bearing section through die casting with the ball section inserted in the casting dies as a core as well as disclosed in Japanese Patent Publication No. 77886/1992. In doing so, the resin liner may be attached to the ball section in advance, and the ball bearing section may be die-cast in such a state such that it covers the resin liner, which makes it possible to embed and fix the resin liner in the ball bearing section.

The casting temperature is 400° C. or more when a zinc alloy is used as the metal material for forming the ball bearing section, and the casting temperature is 600° C. or more when an aluminum alloy is used. The casting temperatures are far beyond the temperature that resins can withstand, and it is normally expected that the resin liner is carbonized when casting is carried out with the resin liner inserted in the casting dies as a core. However, since the ball section having the resin liner has a thermal capacity of a certain magnitude, the resin liner in contact with such a ball section is cooled by the ball section when the ball bearing section is cast. As a result, although the outside of the resin liner or the side that is exposed to the melted casting alloy seizes up on the ball bearing section, the resin sliding contact surface in contact with the ball section does not seize up on the ball section and can be kept in a preferable state of contact with the spherical surface of the ball section even after the ball bearing section is cast. Further, die casting produces products in a cycle time that is quite shorter than that of high pressure casting because a melted casting alloy is quickly injected into dies under a high pressure and cooled immediately, which also makes it possible to minimize damage on the resin liner during casting.

While the resin liner is attached to the ball section before the ball bearing section is cast, the resin liner is preferably molded in a ring-like configuration such that the resin liner can be tightly fitted to the ball section in order to allow the ball section to be handled with ease after the resin liner is attached. If the resin liner embedded in the ball bearing section is dragged by the ball section to rotate in the ball bearing section, the resin liner is worn as a result of friction of the same against the ball bearing section instead of the ball section. From such a point of view, it is preferable to form a stopper on the outer circumferential surface of the resin liner formed in a ring-like configuration to stop rotation of the same relative to the ball bearing section.

Further, while the resin liner may be molded separately from the ball section and attached to the ball section later, it is preferable, from the viewpoint of reduction of labor and cost, to mold the resin liner directly on the outer circumferential surface of the ball section through injection molding with the ball section inserted as a core.

As thus described, in the spherical bearing and the method for manufacturing the same according to the invention, the ball bearing section of the outer member has the metal sliding contact surface for undetachably enclosing and holding the ball section and the resin liner that forms a resin sliding contact surface, and the metal sliding contact surface and resin sliding contact surface are adjacent to each other without any gap between them to form a sliding contact surface for enclosing and holding the ball section. As a result, light and smooth swinging and rotary motions of the inner member and outer member can be achieved by lubricating a microscopic gap formed between the sliding contact surface and the ball section with an oil film. Further, since the resin liner is provided in regions where the pressure at the contact surface between the ball section and ball bearing section is high, the solid body of the ball section contacts the resin sliding contact surface instead of the metal sliding contact surface, which makes it possible to prevent biased wear of the ball section and seize-up of the ball section and ball bearing section even when the oil film becomes discontinuous between the ball section and ball bearing section, thereby allowing the inner member to make preferable swinging and rotary motions for a long time.

Further, since the resin sliding contact surface of the resin liner is in contact with the ball section without any gap between them, shaking between the inner member and outer member can be completely eliminated even when a very small gap exists between the ball bearing section and the metal sliding contact surface.

DETAILED DESCRIPTION OF THE PREFERRED EMBODIMENT

A spherical bearing according to the invention and a method for manufacturing the same will now be described in detail with reference to the accompanying drawings.

Figure 1:
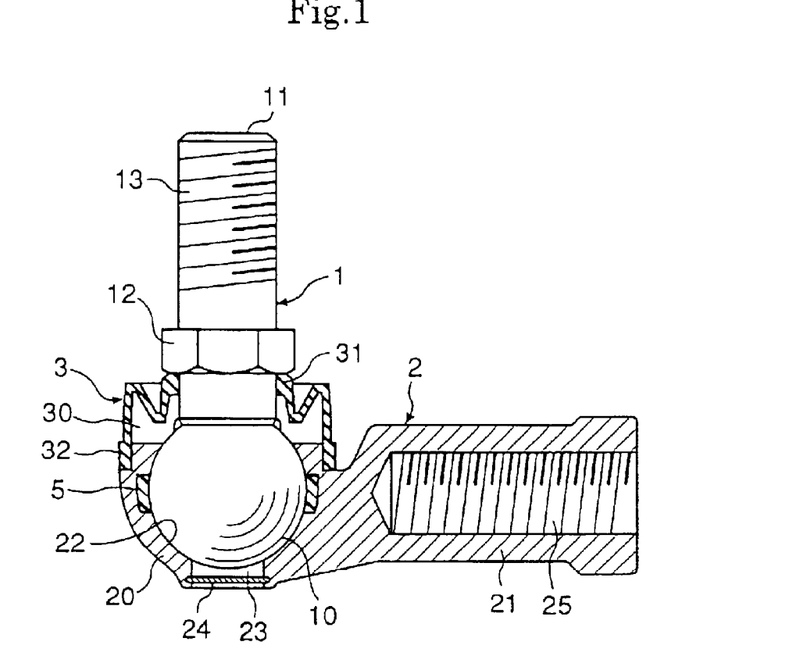
FIG. 1 is a sectional view of a first embodiment of a spherical bearing according to the invention.
Figure 2:
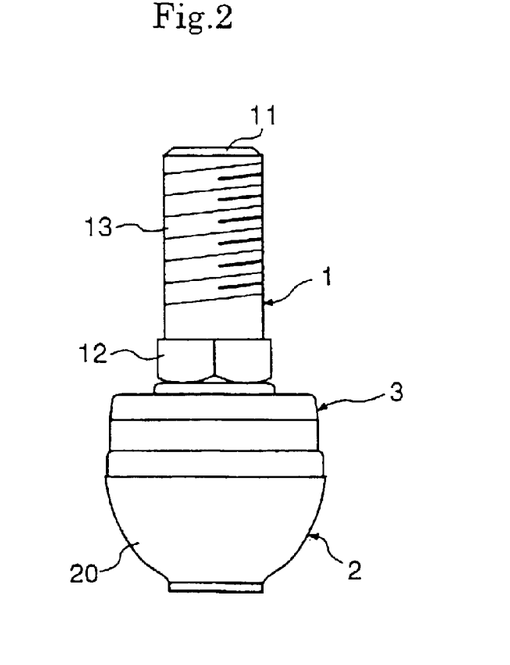
FIG. 2 is a side view of the spherical bearing according to the first embodiment.

FIGS. 1 and 2 show a first embodiment of a spherical bearing according to the invention. The spherical bearing is constituted by a ball shank 1 as an inner member having a ball section at an end thereof and a holder 2 as an outer member having a ball bearing section 20 for enclosing and holding the ball section 10 of the ball shank 1, the ball shank 1 and holder 2 being swingably or rotatably coupled.

The ball shank 1 is formed by welding a rod-shaped shank 11 to a steel ball having a high sphericity to serve as the ball section 10, and a hexagonal bearing surface 12 is formed at the base of the shank 11 for fixing an object to be mounted such as a link. A male thread 13 is formed at the end of the shank 11, and a nut may be engaged with the male thread 13 to sandwich and fix an object to be mounted between itself and the hexagonal bearing surface 12.

The holder 2 has a ball bearing section 20 for enclosing and holding the ball section 10 of the ball shank 1 and a fixing section 21 for coupling the ball bearing section 20 with a link, and the ball bearing section 20 and fixing section 21 are integrally molded by die casting an aluminum alloy or zinc alloy. The ball bearing section 20 covers substantially two-thirds of the ball section 10 such that the ball section 10 of the ball shank 1 will not come out, and a sliding contact surface 22 having a concave spherical configuration substantially compliant to the spherical surface of the ball section 10 is formed inside the ball bearing section 20. As a result, the ball shank 1 can freely make a swinging or rotary motion relative to the holder 2 about the ball section 10 as the center of swinging. Further, the holder 2 is formed with an oil reservoir 23 in a position opposite to the shank 11, and the oil reservoir 23 is closed by a lid member 24. The fixing section 21 is formed with a female thread 25, for example, to allow a male thread formed at an end of a rod that forms a part of a link to be coupled thereto.

A boot seal 3 is mounted between an outer circumferential edge of the holder 2 and the shank 11 of the ball shank 1 to prevent dust, foreign substances and the like from entering the gap between the ball section 10 of the ball shank 1 and the ball bearing section 20 of the holder 2 and to form a sealed pocket 30 for storing a lubricant such as grease. An end 31 of the boot seal 3 closer to the ball shank 1 is in tight contact with the shank 11 due to its elasticity, and an end 32 of the same closer to the holder 2 is sandwiched by an anchor ring and the outer circumferential edge of the holder 2, which prevents this part from coming off as a result of a swinging or rotary motion of the ball shank 1.

The ball bearing section 20 of the holder 2 is molded by casting an aluminum alloy or zinc alloy as described above, and the sliding contact surface 22 in contact with the ball section 10 of the ball shank 1 is also formed from such an alloy. A microscopic gap (which is 0.1 mm or less, for example) is formed between the sliding contact surface 22 of the ball bearing section 20 and the spherical surface of the ball section 10, and a lubricant flows into this gap from the sealed pocket 30 provided on both sides of the ball bearing section 20 and the oil reservoir 23 to form an oil film between the spherical surface of the ball section 10 and the sliding contact surface 22 of the ball bearing section 20. As a result, in this spherical bearing, the ball section 10 constituted by a steel ball and the ball bearing section 20 that is also made of a metal contact with each other in a sliding relationship with lubrication provided between them using an oil film, which allows the ball shank 1 to make a light and smooth motion relative to the holder 2.

Figure 3:
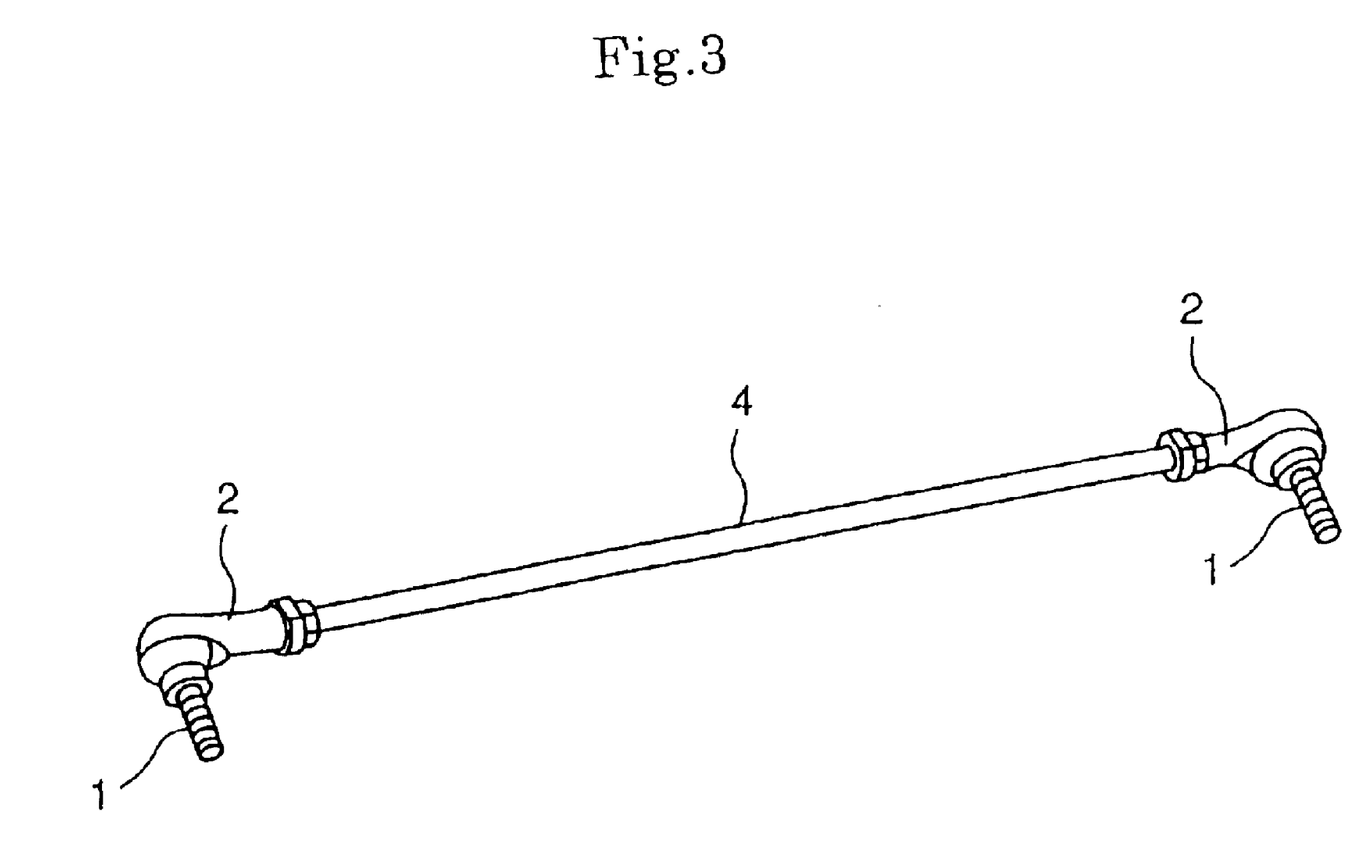
FIG. 3 is a perspective view of the spherical bearing according to the first embodiment showing an example of use of the same.
Figure 4:
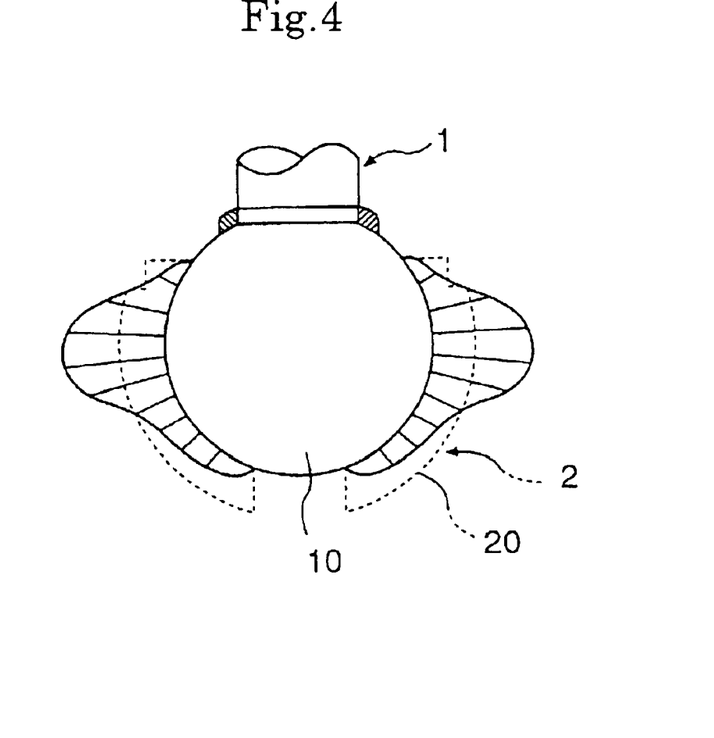
FIG. 4 is an illustration of a load distribution around a ball section of a ball shank in the example of use in FIG. 3.

While the sliding contact surface 22 of the ball bearing section 20 and the spherical surface of the ball section 10 are in substantially uniform contact with each other, the sliding contact surface 22 may be locally subjected to a heavy load depending on the mode of use of the spherical bearing. For example, when a pair of the spherical bearings are coupled to both ends of a rod 4 to form a connecting rod for transmitting a motion from the ball shank 1 of one of the spherical bearings to the ball shank 1 of the other spherical bearing as shown in FIG. 3, there will be a load distribution around the ball section 10 of one of the ball shanks 1 as shown in FIG. 4. Specifically, in this mode of use, since the holder 2 is pushed and pulled by the rod 4 to transmit a motion, a maximum load acts on the sliding contact surface 22 around a maximum-diameter of the ball section 10 that agrees with the longitudinal direction of the rod 4. When a heavy load locally acts on the sliding contact surface 22 of the ball bearing section 20 as thus described, the pressure at the contact surface between the sliding contact surface 22 and ball section 10 increases, and the oil film between them may be broken. If such a situation occurs, since the sliding contact surface 22 and ball section both of which are formed from a metal directly contact each other without intervention of the oil film, the sliding contact surface and the spherical surface of the ball section are damaged. This hinders smooth movement of the ball shank and, in extreme cases, the ball bearing section and ball section seize up to disable the ball shank from moving relative to the holder.

This spherical bearing has a configuration in which a resin liner 5 in the form of a ring that is in contact with the ball section 10 of the ball shank 1 in a sliding relationship is embedded in the ball bearing section 20 of the holder 2 such that a resin sliding contact surface formed by the resin liner 5 is contiguous to the metal sliding contact surface without any gap to form the sliding contact surface 22 of the ball bearing section 20. For example, the resin liner 5 is formed from a PEEK material and provided in the sliding contact surface 22 in localized positions where the breakage of the oil film is considered likely to occur. Therefore, in a spherical bearing that is used as in the example of use in FIG. 3, the resin liner is provided around the maximum diameter of the ball section 10 that agrees with the longitudinal direction of the rod 4, as shown in FIG. 1. The position in the ball bearing section 20 where the resin liner 5 is embedded is not limited to that shown in the example, and it may be provided in an optimum location in accordance with the distribution of the pressure at the contact surface between the ball section 10 and the sliding contact surface 22.

The resin sliding contact surface formed on the inner circumferential surface of the resin liner 5 is contiguous to the metal sliding contact surface without any gap to form the single sliding contact surface 22 and is attached to the ball section through injection molding as described later. Therefore, the resin liner 5 is in contact with the ball section 10 without any pressure, and the ball section 10 is not tightened by the resin liner 5, which allows light and smooth movement of the ball shank 1. Further, even in the case of a heavy load locally acting on the sliding contact surface 22 of the ball bearing section 20 to cause the breakage of the oil film between the ball section 10 and sliding contact surface 22, since the resin liner 5 is provided in locations where the breakage of the oil film is likely to occur and the resin sliding contact surface is in contact with the ball section 10 in a sliding relationship instead of the metal sliding surface as described above, it is possible to prevent damages on the spherical surface of the ball section 10 and to avoid the worst situations such as seize-up between the ball section 10 and ball bearing section 20.

Considering such a function of the resin liner 5 in the case of breakage of the oil film, the resin liner 5 is preferably molded from a material that has high wear-resistant properties and that has self-lubricant properties so that it will not hinder the movement of the ball shank 1 even if it makes solid contact with the ball section 10.

Figure 5:
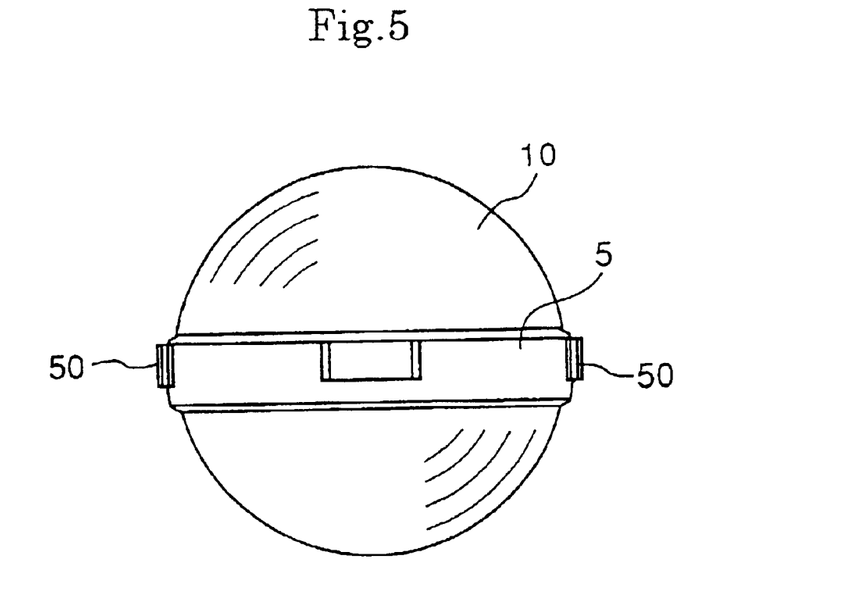
FIG. 5 is a front view of the spherical bearing of the first embodiment showing a state in which a resin liner is attached to the ball section according to a method for manufacturing the same.
Figure 6:
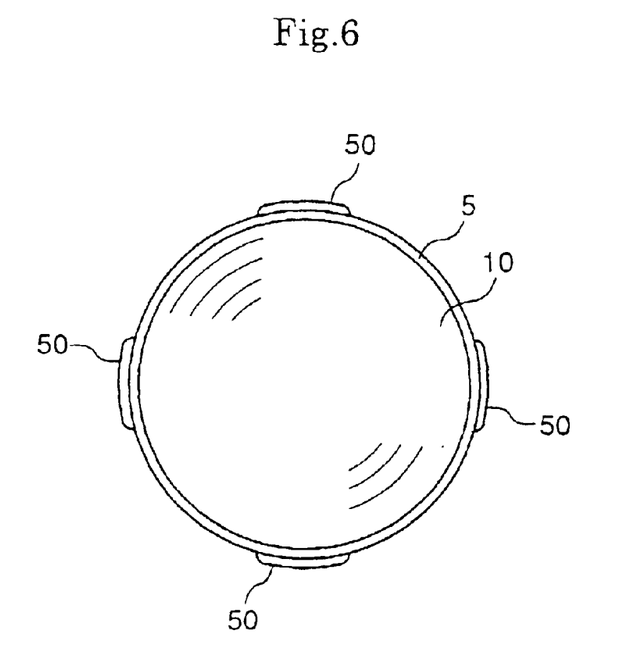
FIG. 6 is a plan view of the spherical bearing of the first embodiment showing the state in which the resin liner is attached to the ball section according to the method for manufacturing the same.

A specific method for manufacturing the spherical bearing of the present embodiment will now be described. The holder 2 of the spherical bearing of the present embodiment is manufactured through die casting with the ball section 10 of the ball shank 1 inserted in the casting dies as a core. Therefore, to embed the resin liner 5 in the ball bearing section 20, the resin liner 5 must be first attached to a steel ball that is to become the ball section 10. FIGS. 5 and 6 are a front view and a plan view showing the steel ball with the resin liner attached thereto. The resin liner 5 is molded in the form of a ring that has an inner diameter that is compliant to the outer diameter of the ball section 10 and attached to the ball section 10 such that it covers the maximum diameter of the ball section 10. Protrusions 50 to serve as rotation stoppers are formed on the outer circumferential surface of the resin liner 5 to prevent the resin liner 5 from rotating relative to the ball bearing section 20 when the resin liner 5 is embedded in the ball bearing section 20 of the holder 2 during subsequent die casting. The resin liner 5 is formed with a thickness of about 0.5 mm that is greater than the gap between the ball bearing section 20 and ball section 10 (0.1 mm or less).

Such a resin liner 5 may be molded separately from the ball section 10 and attached to the ball section 10 prior to die casting of the holder 2. However, when time and labor required for attaching the resin liner 5 to the ball section 10 are taken into consideration, it is preferable to fabricate the resin liner 5 by means of injection molding with the ball section 10 inserted as a core. Specifically, injection molding of a synthetic resin is performed with a steel ball to serve as the ball section 10 inserted in the dies to mold the resin liner 5 and attach the same to the ball section 10 at one step. When the resin liner 5 is molded in such a manner, time and labor for attaching it to the ball section 10 can be saved, and the inner circumferential surface of the resin liner 5 is substantially compliant to the spherical surface of the ball section 10, which makes it possible to attach the resin liner 5 to the ball section 10 reliably while preventing the resin liner 5 from tightening the ball section 10.

Figure 7:
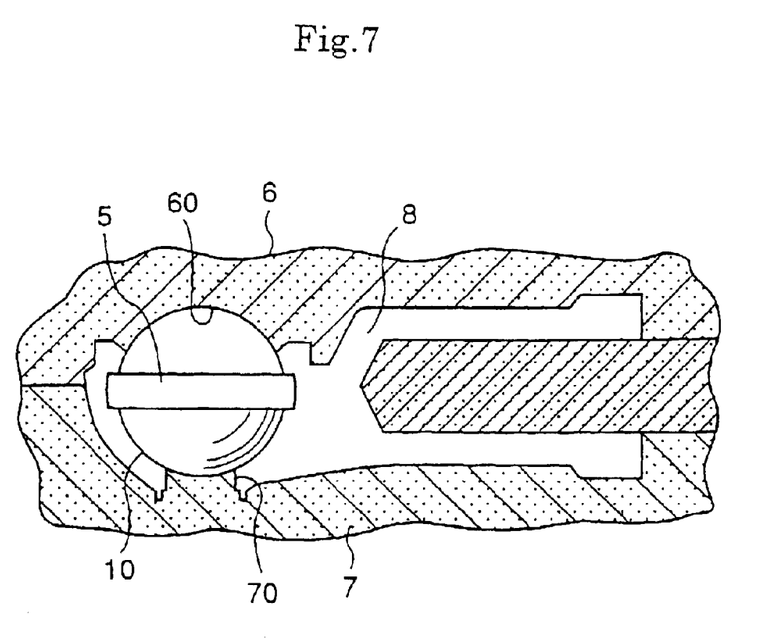
FIG. 7 is a sectional view of the spherical bearing of the first embodiment showing how a holder is cast using the ball section as a core according to the method for manufacturing the same.

Next, the holder is die cast. During the die casting, as shown in FIG. 7, the ball section 10 having the resin liner attached thereto at the previous step is inserted between a pair of upper and lower separate casting dies 6 and 7 as a core, and a melted aluminum alloy or zinc alloy is injected under a pressure into a cavity 8 in the dies in this state. The inserted ball section 10 is sandwiched by support seats 60 and 70 formed in the dies 6 and 7 to prevent any error in positioning of the same in the dies. The resin liner 5 is located in the cavity 8 in a state in which it is attached to the ball section 10 and, therefore, it is covered by the alloy injected into the cavity 8 except its inner circumferential surface that is in contact with the ball section 10.

Figure 8:
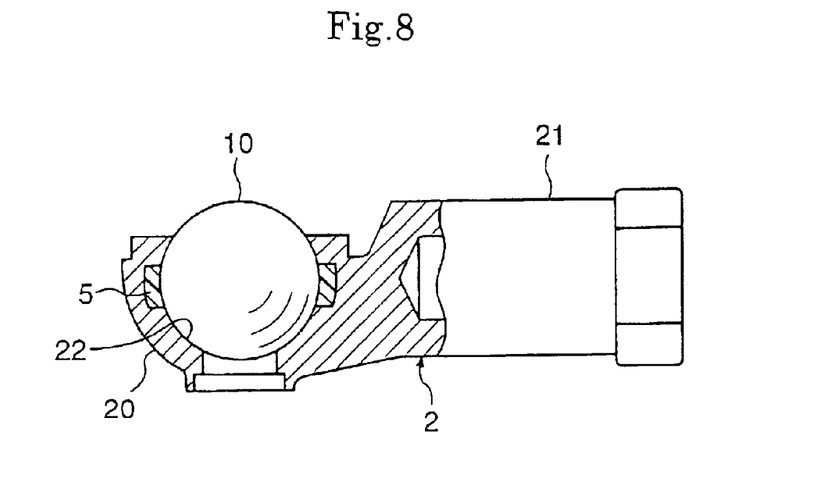
FIG. 8 is a sectional view of the holder cast according to the method of manufacturing the spherical bearing of the first embodiment.

As a result, the holder 2 is cast as shown in FIG. 8 in which the ball section 10 is enclosed by the alloy, and the ball section is exposed from the ball bearing section 20 of the holder 2 only in regions of the same associated with the support seats 60 and 70 of the dies 6 and 7. The resin liner 5 attached to the ball section 10 is embedded in the ball bearing section 20 thus cast and is therefore rigidly fixed to the ball bearing section 20. The casting temperature is 400° C. or more when a zinc alloy is used as the material for the holder 2, and the casting temperature is 600° C. or more when an aluminum alloy is used. Such casting temperatures are far beyond the temperature that the resin liner 5 can withstand, and it is naturally expected that the resin liner 5 formed with a quite small thickness of 0.5 mm will be carbonized during the casting of the holder 2. However, at the manufacturing step utilizing die casting as thus described, the carbonization of the resin liner 5 is prevented because the ball section 10 has a thermal capacity that is much greater than that of the resin liner 5 and plays a role of absorbing thermal energy that has flowed into the resin liner 5 from the melted casting alloy. Therefore, while the outer circumferential surface of the resin liner 5 in contact with the ball bearing section 20 seizes up on the ball bearing section 20, the inner circumferential surface of the same in contact with the ball section 10 remains uncarbonized to from a resin surface that is in contact with the ball section 10 in a sliding relationship. Further, the melted casting alloy is quickly injected into the cavity 8 under a high pressure during the die casting, and it takes a quite short time in the range from 5 to 10 seconds to release the holder 2 after the melted alloy is injected. This is considered to be another factor that prevents the carbonization of the resin liner 5 during the casting of the holder 2.

Figure 9:
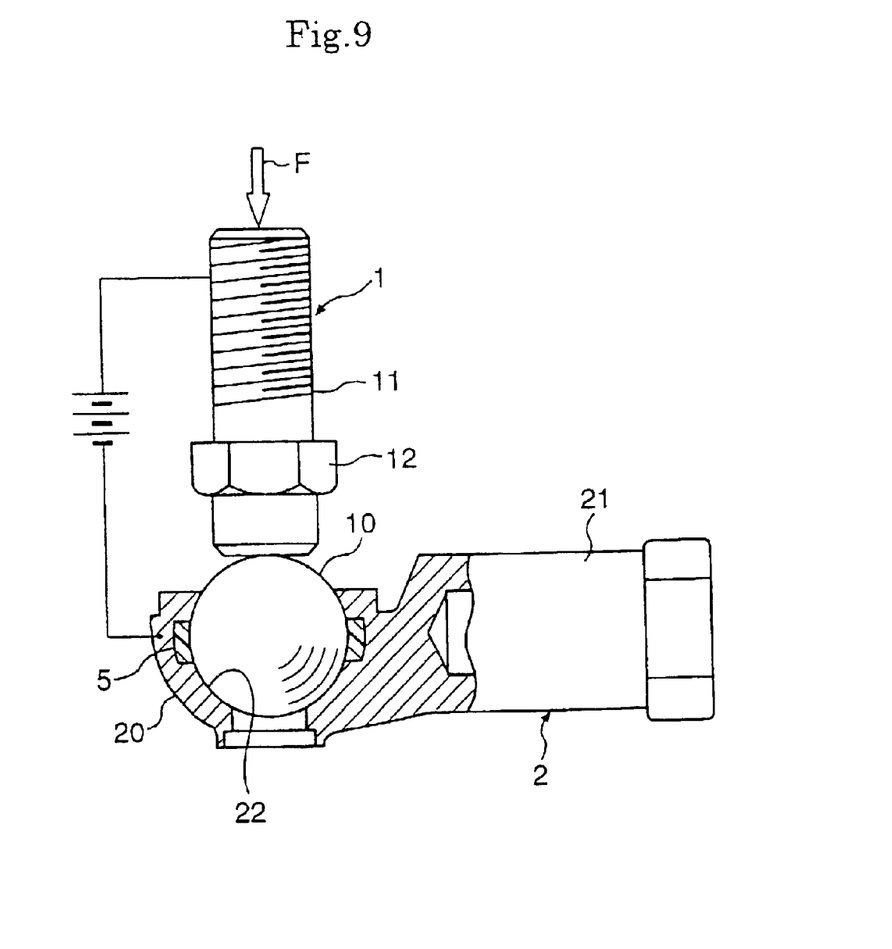
FIG. 9 is a sectional view of the spherical bearing of the first embodiment showing how a shank is welded to the ball section enclosed and held in the holder according to the method for manufacturing the same.

Next, the shank 11 is welded to the ball section 10 enclosed and held in the ball bearing section 20 of the holder 2. Such welding is carried out using projection welding in which an end face of the shank 11 is urged into contact with the spherical surface of the ball section 10 exposed from the ball bearing section 20 of the holder 2 with a predetermined force F and in which an electrode is put into contact with each of the holder 2 and shank 11 to apply a predetermined welding current between the electrodes as shown in FIG. 9. Since the ball bearing section 20 of the holder 2 has been put in tight contact with the ball section 10 when cast at the previous step, there is a quite small conduction resistance at the boundary between the ball bearing section 20 and ball section 10 when the welding current is thus indirectly applied to the ball section 10 through the holder 2. It is therefore possible to bond the shank 11 to the ball section 10 without welding the ball bearing section 20 and ball section 10 together. Further, since the resin liner 5 covers only a part of the spherical surface of the ball section 10, it does not hinder the conduction of the welding current from the ball bearing section 20 to the ball section 10. When the projection welding is thus finished, the ball shank 1 is completed in which the ball section 10 is enclosed and held in the ball bearing section 20 of the holder 2.

Thereafter, an external force is applied to the holder 2 or ball shank 1 to form a microscopic gap between the ball bearing section 20 and ball section 10 that are still in tight contact with each other. Referring to the application of such an external force, for example, the ball section 10 may be lightly shocked by patting the outer circumference of the ball bearing section 20 or patting the ball shank 1 in the axial direction thereof. As a result, the ball section 10 of the ball shank 1 freely slides in the ball bearing section 20 of the holder 2 in contact therewith, and the ball shank 1 and the holder 2 are swingably or rotatably coupled with each other.

While a microscopic gap is formed between the metal sliding contact surface of the ball bearing section 20 and the ball section 10 as a result of elastic deformation at this time, the resin liner 5 is still in tight contact with the ball section 10 because it is elastically deformed. Therefore, the ball shank 1 will never shake in the holder 2 even when there is no load.

Finally, the above-described boot seal 3 is mounted between the shank 10 and the outer circumferential edge of the holder 2, and the sealed pocket 30 formed by the boot seal 3 is filled with a lubricant such as grease to complete the spherical bearing of the present embodiment.

Figure 10:
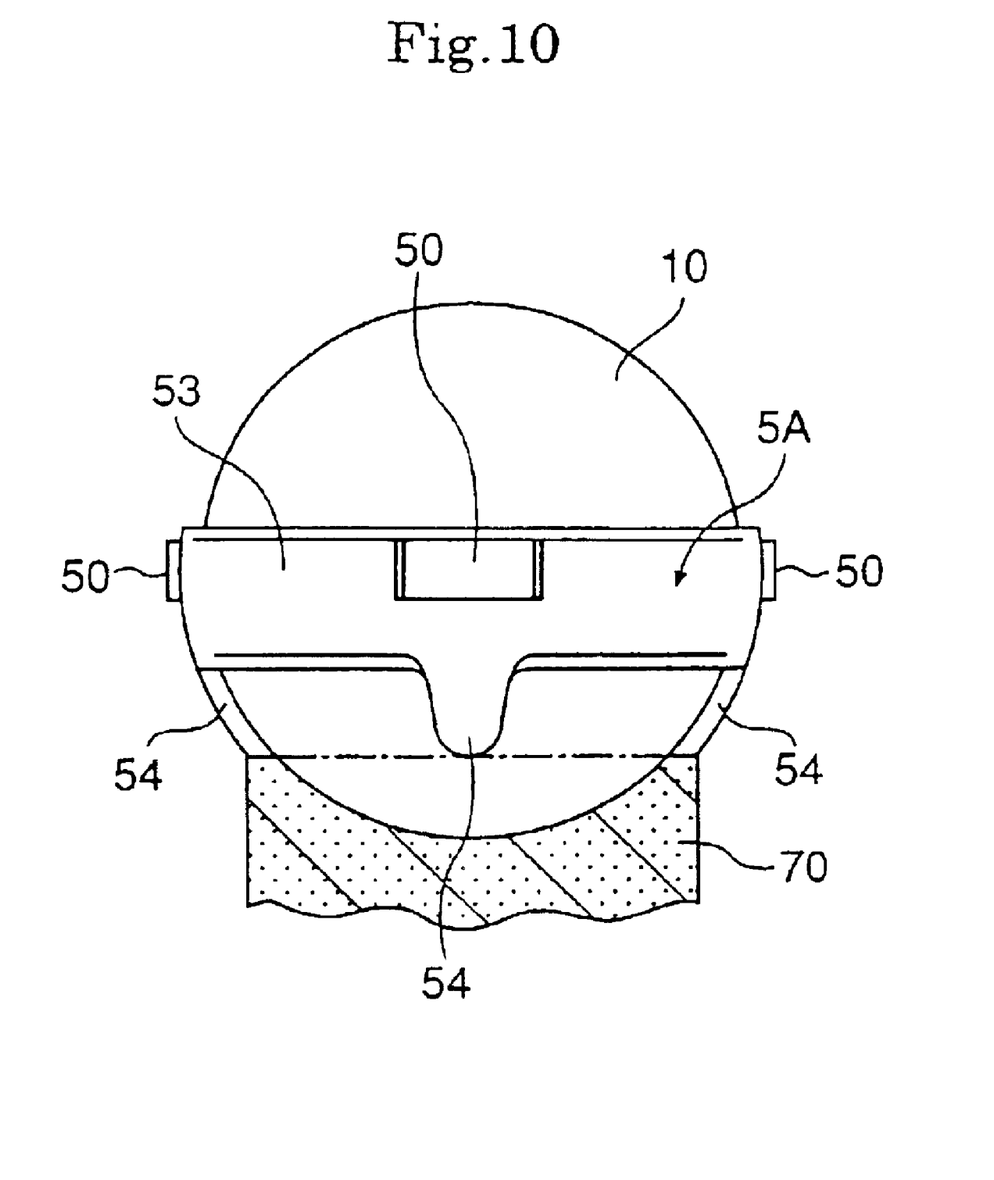
FIG. 10 illustrates another example of a configuration of a resin liner.

FIG. 10 is a front view of another example of the resin liner 5. As described above, the holder 2 is fabricated through die casting with the ball section 10 inserted in the casting dies 6 and 7 as a core. Since the resin liner 5 is attached to the ball section 10 prior to the die casting, it is inserted in the casting dies 6 and 7 along with the ball section 10. As shown in FIG. 8, the resin liner 5 is covered by the holder 2 except the surface of the same in contact with the ball 10 after the holder 2 is cast. Therefore, the resin liner 5 formed in a simple ring-like configuration as shown in FIGS. 5 and 6 is not in contact with the casting dies 6 and 7 at all, although it is in contact with the ball section 10. Therefore, the resin liner 5 may be displaced relative to the ball section 10 when the melted casting alloy is quickly injected into the cavity 8 under a high pressure and, in such a case, the resin liner 5 can not be embedded in a predetermined location in the ball bearing section 20 of the holder 2.

A resin liner 5A shown in FIG. 10 is provided with a plurality of legs 54 protruding downward from a ring section 53 that surrounds the ball section 10 such that the legs 54 contact an edge of the support seat 70 of the casting die 7 when the ball section 10 is set in the casting dies 6 and 7. As a result, the resin liner 5A inserted in the casting dies 6 and 7 is kept in a predetermined attitude when the ball section 10 is set on the support seat 70, which makes it possible to keep it in the attitude at the time of the mounting to the ball section 10 even when the melted alloy at a high pressure is forcibly injected into the cavity 8. Therefore, when the resin liner 5A shown in FIG. 10 is used, the resin liner 5A can be always embedded in a predetermined location in the ball bearing section 20 of the holder 2. Reference number 50 in FIG. 10 represents protrusions for stopping rotation similar to those on the resin liner 5 shown in FIG. 5. It is not always essential that the legs 54 protrude downward from the ring section 53, and they may protrude upward into contact with an edge of the support seat 60 of the casting die 6.

While the above-described first embodiment of the invention has referred to a ball shank in which a ball section is integrally bonded to an end of a shank as an inner member according to the invention, another example is possible in which a through hole is formed on the ball section and a rod or the like is fixed to the ball section using the through hole.

What is claimed is:

1. A method for manufacturing a spherical bearing having an inner member with a ball section and an outer member with a ball bearing section for enclosing and holding the ball section of the inner member to be coupled with the inner member such that it can be swung or rotated relative to the inner member, which comprises the steps of:

attaching a resin liner to the ball section of the inner member using injection molding with the ball section inserted as a core, for forming a resin sliding contact surface in tight contact with the ball section, wherein the resin line will be entirely encompassed by the ball bearing section;

performing die casting of the ball bearing section that covers the resin liner with the ball section having the resin liner inserted in the casting dies, for forming a metal sliding surface in tight contact with the ball section of the inner member, wherein the resin sliding contact surface is contiguous to the metal sliding contact surface without any gap, to form a single sliding contact surface of the ball bearing section and applying an external force to the ball section or ball bearing section, thereby allowing the ball section and ball bearing section to rotate relative to each other.

2. A method for manufacturing a spherical bearing according to claim 1, wherein the resin liner is formed in a ring-like configuration and formed with a rotation stopper on an outer circumferential surface thereof.

3. A method for manufacturing a spherical bearing according to claim 2, wherein the resin liner is provided with a leg that contacts the casting dies during die casting to keep the state of attachment of the resin liner relative to the ball.

4. The method of claim 1, wherein the die casting step further comprises the embedding of the resin liner in the ball bearing section during the die casting.

5. The method of claim 1, wherein the die casting step further comprises pouring an alloy over the ball section and resin liner so that all of the ball section, excepting any area of the ball section that is covered by the resin liner, is covered with the alloy.

6. The method of claim 1, wherein the method further comprises a step of welding a shank to the ball section.

7. The method of claim 6, wherein the welding is projection welding.

8. The method of claim 1, wherein the external force applied to the ball section or the ball bearing section is undertaken by striking a section of the outer surface of the ball bearing section in the axial direction thereof with sufficient force to create a gap between the ball section and the ball bearing section.

9. The method of claim 1, wherein the method further comprises the step of mounting a boot seal between a shank and an outer circumferential edge of a holder.

10. The method of claim 9, wherein the step of mounting the boot seal further comprises forming a sealed pocket between the boot seal and ball bearing section.

11. The method of claim 10, wherein the step of mounting the boot seal further comprises filling the sealed pocket with lubricant.

* * * * *